United States Patent
Ouellette et al.

(10) Patent No.: US 9,690,291 B2
(45) Date of Patent: Jun. 27, 2017

(54) AIRCRAFT SIDESTICK PRIORITY AND DUAL INPUT CONTROL LOGIC

(71) Applicant: Bombardier Inc., Dorval (CA)

(72) Inventors: Benoit Ouellette, Verdun (CA); Sophie Duchesne, Verdun (CA); Frederic Lecoq, Toronto (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 14/896,940

(22) PCT Filed: Jun. 9, 2014

(86) PCT No.: PCT/IB2014/000997
§ 371 (c)(1),
(2) Date: Dec. 9, 2015

(87) PCT Pub. No.: WO2014/199212
PCT Pub. Date: Dec. 18, 2014

(65) Prior Publication Data
US 2016/0109882 A1 Apr. 21, 2016

Related U.S. Application Data

(60) Provisional application No. 61/835,090, filed on Jun. 14, 2013.

(51) Int. Cl.
*G05D 1/00* (2006.01)
*B64C 13/12* (2006.01)

(52) U.S. Cl.
CPC ......... *G05D 1/0061* (2013.01); *G05D 1/0077* (2013.01); *B64C 13/12* (2013.01)

(58) Field of Classification Search
CPC ..... B64C 13/12; G05D 1/0061; G05D 1/0077
(Continued)

(56) References Cited

U.S. PATENT DOCUMENTS 4,765,568 A * 8/1988 Carl .................... B64C 13/42
244/197
5,456,428 A * 10/1995 Hegg .................... B64C 13/12
244/229

(Continued)

FOREIGN PATENT DOCUMENTS

CN 101419461 A 4/2009

OTHER PUBLICATIONS

PCT international Search Report and Written Opinion dated Sep. 22, 2014 re: International Application No. PCT/IB2014/000997.
(Continued)

*Primary Examiner* — Tyler J Lee
(74) *Attorney, Agent, or Firm* — Norton Rose Fulbright Canada LLP

(57) ABSTRACT

The present invention relates to a fly-by-wire type of aircraft flight control system having a pair of sidesticks for pilot and co-pilot input, respectively, and having logic that controls the priority of input as between the two sidesticks in certain aircraft flight situations. It allows either the pilot or co-pilot to ensure that his/her sidestick is the only one issuing flight control commands at any one moment in time by first pressing a simple latch button located, for example, on the glareshield in the cockpit and then maneuvering the sidestick in the desired manner to effectuate flight control, e.g., pitch and/or roll, of the aircraft.

43 Claims, 4 Drawing Sheets

(58) Field of Classification Search
USPC .............................................................. 701/3
See application file for complete search history.

(56) References Cited

U.S. PATENT DOCUMENTS

| | | | | |
|---|---|---|---|---|
| 5,694,014 | A * | 12/1997 | Hegg | G05D 1/0077 |
| | | | | 244/223 |
| 6,062,513 | A * | 5/2000 | Lambregts | G05D 1/0638 |
| | | | | 244/175 |
| 2011/0066305 | A1* | 3/2011 | Lin | B64C 13/503 |
| | | | | 701/3 |
| 2012/0025029 | A1 | 2/2012 | Szulyk et al. | |
| 2012/0290153 | A1* | 11/2012 | Olsoe | B64C 13/42 |
| | | | | 701/3 |

OTHER PUBLICATIONS

Airbus Industrie, A330 Flight Deck and Systems Briefing for Pilots, Mar. 31, 1999, STL 472/55/92 Issue 4.
Chinese Patent Office; Office Action dated Dec. 29, 2016 re: Chinese Patent Application No. 201480032904.0.
English translation of Chinese patent documentNo. CN 101419461 dated Apr. 29, 2009; www.googlepatents.ca/patents . . . .

* cited by examiner

AIRCRAFT SIDESTICK PRIORITY AND DUAL INPUT CONTROL LOGIC

CROSS REFERENCE TO RELATED APPLICATION AND CLAIM OF PRIORITY

This application is a national phase application under 35 U.S.C. 371 of International Patent Application No. PCT/IB2014/000997 filed on Jun. 9, 2014, which claims priority from U.S. provisional patent application No. 61/835,090 filed on Jun. 14, 2013, the entire contents of both of which are hereby incorporated by reference.

FIELD OF THE INVENTION

The present invention relates in general to flight control systems for aircraft, and in particular, to a fly-by-wire type of aircraft flight control system having a pair of sidesticks for pilot and co-pilot input, respectively, and having logic that controls the priority of input as between the two sidesticks in certain aircraft flight situations.

BACKGROUND OF THE INVENTION

Fly-by-wire ("FBW") aircraft flight control systems are increasingly becoming the preferred type of flight control system for modern aircraft. The FBW type of control system replaces the relatively heavier and more error prone mechanical and hydro-mechanical types of flight control systems.

Stated simply, a fly-by-wire aircraft flight control system comprises a computer system interposed between the flight control inputs given manually by the pilot and co-pilot (and automatically by various aircraft subsystems) and the flight control surfaces that ultimately control the direction of the aircraft in flight. That is, the inputs from the pilot or co-pilot are not connected directly to the aircraft flight control surfaces desired to be controlled (e.g., ailerons, rudder, elevators, spoilers, slats, flaps, etc.). Instead, the pilot and co-pilot inputs are routed to a computer system (e.g., typically comprising more than one computer or data processor type of device) that contains the flight control logic which interprets the pilots' inputs and moves the aircraft flight control surfaces according to control laws ("CLAWS") stored in the computer system to effect changes in the aircraft's pitch, roll, yaw, altitude, etc., for example. In the alternative, the computer system can be replaced partly or entirely with analog electronic circuits to achieve the same result. However, the clear trend is to use digital computers that contain the flight control logic and which are interposed between the primary pilot control input devices (e.g., sidestick or yoke, rudder pedals) and the actuators associated with their respective aircraft flight control surfaces.

FBW control systems represent a relatively large weight savings (and, thus, significantly reduced fuel costs) on the aircraft as compared to the traditional mechanical or hydro-mechanical flight control systems as the relatively heavy and bulky cables and associated mechanical components of the traditional systems are replaced by wires and relatively simple actuators. Other advantages of FBW systems include a reduction in the workload of the pilots, reduced maintenance time and costs, and increased flight safety as the flight control laws and overall flight envelope can be more precisely tailored to the pilots' sidestick or yoke control input devices. The FBW control system even allows for "automatic pilot" operation of the aircraft in certain flight situations as the flight control computer is typically responsive to various sensor inputs and directs the aircraft flight control surfaces according to the control laws—all without pilot input or involvement.

However, FBW control systems are not without their drawbacks. The older mechanical and hydro-mechanical flight control systems tended to fail gradually over time. This made it relatively easy to identify and correct in advance for any such failures. In contrast, the computer-based FBW control systems tend to fail "completely" in that the computer system running the flight control laws may suddenly "crash" and leave the pilots without the ability to control the aircraft. Thus, typically some type of redundancy is built into a FBW system. For example, three or four computers may be used that are redundantly connected (e.g., in a "triplex" or "quadruplex" configuration) and may even be of different hardware and/or software design to avoid a multiplicity of computer failures at any one time. That way if one of the flight control computers fails then two or three other flight control computers are still operational and can control the aircraft. A FBW system may even have a mechanical flight control system as a backup in case of a failure of the flight control computer(s).

In a FBW flight control system, the primary input device for the pilot and co-pilot to the FBW flight control system is typically either a sidestick or a yoke. The yoke is the older and more traditional device and is preferred by some pilots (even for use with FBW systems). This is because the yoke gives both pilots tactile feedback when one of the pilot moves the yoke while controlling the aircraft's pitch and roll movements, for example. That is, the pilot and co-pilot yokes are connected together such that a movement of a yoke by the pilot results in a corresponding automatic similar physical movement of the co-pilot's yoke, and vice-versa.

In contrast, sidesticks tend to be somewhat better than yokes in allowing the pilots to make relatively more rapid control inputs through simple and quick movements of the sidestick in any direction. This is because relatively less pilot manual force is required to move the sidestick as compared to the yoke. Also, the sidesticks take up much less space in the aircraft cockpit. This is because the sidesticks are relatively smaller than the yokes and are located off to the side of each of the pilot and co-pilot (i.e., left side of pilot, right side of co-pilot). A sidestick only requires one hand to grip the sidestick (e.g., left hand for the pilot, right hand for the co-pilot). In contrast, the yokes are typically located in front of each of the pilot and co-pilot and usually require both hands to operate.

However, in contrast to a yoke, when one pilot moves his/her sidestick, the sidestick of the other pilot typically does not move in correspondence. That is, the two sidesticks (i.e., one for the pilot and another for the co-pilot) are usually independent of one another in terms of issuing flight control commands. This lack of feedback to the other pilot may result in a potentially dangerous "dual input" situation where both pilots are "fighting" for control of the aircraft if both pilots are issuing aircraft flight control commands simultaneously using their own sidestick and, perhaps, unbeknownst to one another. Typically such a situation is handled by having the FBW control system algebraically sum the inputs from both pilots and with a maximum value or limit in place for each of various commandable flight control parameters which cannot be exceeded by the sum of the two inputs. Yet, it is known to couple the two sidesticks together in some implementations such that movement of one of the sidesticks results in a "feedback-type" of movement of the other sidestick.

Also, as currently implemented in most sidestick-controlled commercial aircraft, a sidestick does not provide a pilot who is issuing flight control commands with his/her sidestick with the same type of tactile (e.g., visual) feedback as does a yoke. This lack of tactile feedback somewhat deprives the pilot of a sense of how the aircraft is behaving during flight. This lack of feedback is a drawback with some pilots, particularly those pilots who have spent the majority of their careers flying aircraft with a yoke as the primary flight control input device. On its modern aircraft, Boeing still uses separate yokes for the pilot and co-pilot even with a FBW system on the aircraft. In contrast, Airbus uses a sidestick for each of the pilots on its modern aircraft with a FBW system.

In the aforementioned situation where both pilots are simultaneously issuing flight control commands using their own sidesticks (i.e., a "dual input" situation), it is known to utilize a priority scheme in which, for example, a "priority" button or switch located on the sidestick, when depressed or otherwise activated by one of the pilots and held in that position, momentarily prevents or "locks-out" any flight control command inputs from the other pilot using his/her sidestick from taking effect. The priority button or switch may also act as the autopilot disconnect or disengage switch to turn off the autopilot control in the aircraft flight control system. This activation of a priority button or switch by one of the pilots effectively deactivates the dual input situation by preventing the pilot who now does not have priority from continuing to issue flight commands using his/her sidestick. This momentary priority given to the pilot who is activating the priority button or switch on his/her sidestick usually lasts for only as long as the priority button or switch is depressed. Once the pilot releases the button or switch on his/her sidestick that pilot loses his/her priority of giving commands to the aircraft flight control system. The other pilot can then take over priority by activating the priority button on his/her sidestick.

Still further, it is known that in some implementations if one of the pilots depresses or otherwise activates the priority button on his/her sidestick for a certain period of time (e.g., 30 seconds), then that pilot obtains a "latched" priority in which that pilot can then release the button and still maintain priority. However, having to hold the priority button for 30 seconds can be a cumbersome task, particularly if that pilot is performing other functions at the same time.

Also, in this situation some type of visual and/or aural feedback is given in the cockpit to both pilots to make them aware as to which pilot currently has sidestick priority control using his/her sidestick. For example, the visual feedback regarding the current priority status may be given on the main panel of the cockpit itself (e.g., on the primary flight display), and/or also on a display located on the glareshield in front of each of the pilot and co-pilot. The aural feedback may be a recorded voice spoken in the cockpit telling both pilots who currently has priority.

Further, because the inceptor priority button mounted on the sidestick typically also functions to disconnect the autopilot function in the aircraft (e.g., traditionally on final approach of the aircraft to the runway at an airport), this combination of sidestick priority and autopilot disconnect on the same control device can have unintended consequences; for example cancelling a sidestick priority condition and allowing a failed inceptor (i.e., the priority button) to provide erroneous commands to the FBW control system in a critical phase of aircraft flight.

What is needed are aircraft sidesticks for both the pilot and co-pilot to provide input commands to an aircraft flight control system having an improved method of effectuating a "latched" (as opposed to a "temporary" or "momentary") sidestick priority condition for either one of the pilots, which allows for a quicker and easier transition from a potentially dangerous "dual input" flight control condition to a safer flight control condition where only one pilot has sidestick priority for entering commands to the aircraft flight control system.

SUMMARY OF THE INVENTION

According to an embodiment of the present invention, a flight control system for an aircraft includes a processor that processes a plurality of inputs from the aircraft that contains a plurality of control laws that control operation of the aircraft, and that provides a plurality of outputs that control a plurality of devices located on the aircraft. The flight control system also includes a pair of first input devices, a first one of the first input devices controlled by a pilot of the aircraft, a second one of the first input devices controlled by a co-pilot of the aircraft, each one of the first input devices being operable to input a first control signal to the processor to cause the aircraft to be in a first control condition. The flight control system further includes a pair of second input devices located apart from the pair of first input devices, a first one of the second input devices controlled by a pilot of the aircraft, a second one of the second input devices controlled by a co-pilot of the aircraft, each one of the second input devices being operable to input a second control signal to the processor to cause the aircraft to be in a second control condition.

In an advantageous embodiment of the present invention, each one of the pair of first input devices comprises a sidestick controller.

In an advantageous embodiment of the present invention, each sidestick controller includes a momentary priority switch that, when activated by the pilot or co-pilot, is operable to input the first control signal to the processor.

In an advantageous embodiment of the present invention, the first control signal comprises a momentary priority control signal that indicates which one of the pilot or co-pilot has current momentary control of the aircraft.

In an advantageous embodiment of the present invention, when the pilot or co-pilot has current momentary control of the aircraft, the other one of the pilot or co-pilot can take over current momentary control of the aircraft by activating the momentary priority switch on the corresponding sidestick controller.

In an advantageous embodiment of the present invention, visual and/or aural awareness cues are provided to announce to the pilot and co-pilot which one of the pilot or co-pilot has current momentary control of the aircraft.

In an advantageous embodiment of the present invention, each one of the pair of second input devices comprises a push button annunciator.

In an advantageous embodiment of the present invention, each push button annunciator includes a permanent priority switch that, when activated by the pilot or co-pilot, is operable to input the second control signal to the processor.

In an advantageous embodiment of the present invention, the second control signal comprises a permanent priority control signal that indicates which one of the pilot or co-pilot has current permanent control of the aircraft.

In an advantageous embodiment of the present invention, when the pilot or co-pilot has current permanent control of the aircraft, the other one of the pilot or co-pilot can take over current permanent control of the aircraft by activating the corresponding push button annunciator.

In an advantageous embodiment of the present invention, each one of the push button annunciators is located on a glareshield within a cockpit of the aircraft.

In an advantageous embodiment of the present invention, the glareshield includes a visual cue that announces to the pilot and co-pilot which one of the pilot or co-pilot has current permanent control of the aircraft.

In an advantageous embodiment of the present invention, visual and/or aural awareness cues are provided to announce to the pilot and co-pilot which one of the pilot or co-pilot has current permanent control of the aircraft.

In an advantageous embodiment of the present invention, each one of the pair of first input devices comprises a sidestick controller, each sidestick controller being movable by the corresponding pilot and co-pilot to issue a plurality of control commands to the processor.

In an advantageous embodiment of the present invention, the plurality of control commands include aircraft pitch and roll commands.

In an advantageous embodiment of the present invention, when the pilot and co-pilot simultaneously issue the plurality of commands to the processor, a dual input condition occurs.

In an advantageous embodiment of the present invention, when the dual input condition occurs, both visual and aural awareness cues relating to the existence of the dual input condition are provided to the pilot and co-pilot.

In an advantageous embodiment of the present invention, the flight control system comprises a fly-by-wire type of aircraft control system.

In an advantageous embodiment of the present invention, the pair of first input devices comprises at least one yoke.

According to another embodiment of the present invention, a method is disclosed for controlling a priority of input to an aircraft flight control system as between a pilot and a co-pilot each using two input devices associated with the pilot and the co-pilot, respectively. The method includes the step of checking first if both the pilot and the co-pilot have simultaneously issued an input command to the flight control system using the first one of the two input devices associated with either the pilot or the co-pilot. The method also includes the step of if both the pilot and the co-pilot have simultaneously issued an input command to the flight control system, checking if either the pilot or the co-pilot has requested temporary priority of input to the flight control system using the first one of the two input devices associated with either the pilot or the co-pilot. The method further includes the step of if neither the pilot nor the co-pilot has requested temporary priority of input to the flight control system, checking if either the pilot or the co-pilot has requested permanent priority of input to the flight control system using the second one of the two input devices associated with either the pilot or the co-pilot. Also, the method includes the step of if neither the pilot nor the co-pilot has requested permanent priority of input to the flight control system, checking second if both the pilot and the co-pilot have simultaneously issued an input command to the flight control system using the first one of the two input devices associated with either the pilot or the co-pilot. Further, the method includes the step of if either the pilot or the co-pilot has requested temporary priority of input to the flight control system using the first one of the two input devices associated with either the pilot or the co-pilot, assigning temporary priority of input to the flight control system to the one of the pilot or the co-pilot that requested temporary priority of input. Still further, the method includes the step of if either the pilot or the co-pilot has requested permanent priority of input to the flight control system using the second one of the two input devices associated with either the pilot or the co-pilot, assigning permanent priority of input to the flight control system to the one of the pilot or the co-pilot that requested permanent priority of input.

In an advantageous embodiment of the present invention, the method also includes the steps of if one of the pilot or the co-pilot has been assigned temporary priority of input to the flight control system, checking if the other one of the pilot and co-pilot not assigned temporary priority of input to the flight control system has requested temporary priority of input to the flight control system; and if the other one of the pilot and co-pilot not assigned temporary priority of input to the flight control system has requested temporary priority of input to the flight control system, assigning temporary priority of input to the flight control system to the other one of the pilot or the co-pilot that requested temporary priority of input.

In an advantageous embodiment of the present invention, the method also includes the steps of if one of the pilot or the co-pilot has been assigned temporary priority of input to the flight control system, checking if the other one of the pilot and co-pilot not assigned temporary priority of input to the flight control system has requested permanent priority of input to the flight control system; and if the other one of the pilot and co-pilot not assigned temporary priority of input to the flight control system has requested permanent priority of input to the flight control system, assigning permanent priority of input to the flight control system to the other one of the pilot or the co-pilot that requested permanent priority of input.

In an advantageous embodiment of the present invention, the method also includes the steps of if one of the pilot or the co-pilot has been assigned permanent priority of input to the flight control system, checking if the other one of the pilot and co-pilot not assigned permanent priority of input to the flight control system has requested temporary priority of input to the flight control system; and if the other one of the pilot and co-pilot not assigned temporary priority of input to the flight control system has requested permanent priority of input to the flight control system, assigning permanent priority of input to the flight control system to the other one of the pilot or the co-pilot that requested permanent priority of input.

In an advantageous embodiment of the present invention, the method also includes the steps of if one of the pilot or the co-pilot has been assigned permanent priority of input to the flight control system, checking if the other one of the pilot and co-pilot not assigned permanent priority of input to the flight control system has requested permanent priority of input to the flight control system; and if the other one of the pilot and co-pilot not assigned permanent priority of input to the flight control system has requested permanent priority of input to the flight control system, assigning permanent priority of input to the flight control system to the other one of the pilot or the co-pilot that requested permanent priority of input.

In an advantageous embodiment of the present invention, the method also includes the steps of if, as a result of the checking first or checking second if both the pilot and the co-pilot have simultaneously issued an input commend to the flight control system, the pilot and the co-pilot have not both simultaneously issued an input command to the flight control system, checking if either the pilot or the co-pilot has requested either temporary or permanent priority of input to the flight control system and, if so, assigning either temporary or permanent priority to the one of the pilot or the co-pilot that requested the temporary or the permanent priority.

In an advantageous embodiment of the present invention, the method also includes the steps of if either the pilot or the co-pilot has requested temporary priority of input to the flight control system using the first one of the two input devices associated with either the pilot or the co-pilot, checking if an autopilot function on the aircraft is on and if so turning the autopilot function off before assigning temporary priority of input to the flight control system to the one of the pilot or the co-pilot that requested temporary priority of input.

In an advantageous embodiment of the present invention, the method also includes the steps of if either the pilot or the co-pilot has requested temporary priority of input to the flight control system using the first one of the two input devices associated with either the pilot or the co-pilot, checking if an autopilot function on the aircraft is on and if so turning the autopilot function off before assigning temporary priority of input to the flight control system to the one of the pilot or the co-pilot that requested temporary priority of input.

In an advantageous embodiment of the present invention, the method also includes the steps of wherein a first one of the two input devices associated with the pilot comprises one of a sidestick or a yoke; and wherein a first one of the two input devices associated with the co-pilot comprises one of sidestick or a yoke.

In an advantageous embodiment of the present invention, the method further includes the steps of wherein a second one of the two input devices associated with the pilot comprises a pilot actuation device located on a glareshield in a cockpit of the aircraft; and wherein a second one of the two input devices associated with the co-pilot comprises a co-pilot actuation device located on the glareshield.

In an advantageous embodiment of the present invention, the method also includes the steps of providing a visual annunciation cue to both the pilot and the co-pilot that visually indicates which one of the pilot or the co-pilot has been assigned temporary priority of input to the flight control system, or that visually indicates which one of the pilot or the co-pilot has been assigned permanent priority of input to the flight control system.

In an advantageous embodiment of the present invention, the method also includes the steps of providing an aural annunciation cue to both the pilot and the co-pilot that aurally indicates which one of the pilot or the co-pilot has been assigned temporary priority of input to the flight control system, or that indicates which one of the pilot or the co-pilot has been assigned temporary priority of input to the flight control system.

According to yet another embodiment of the present invention, a computer program product is disclosed for controlling a priority of input to an aircraft flight control system as between a pilot and a co-pilot each using two input devices associated with the pilot and the co-pilot, respectively. The computer program product comprises a non-transitory computer readable storage medium having program code embodied therewith, the program code readable/executable by a computer, processor or logic circuit to perform a method that includes the step of checking first if both the pilot and the co-pilot have simultaneously issued an input command to the flight control system using the first one of the two input devices associated with either the pilot or the co-pilot. The method also includes the step of if both the pilot and the co-pilot have simultaneously issued an input command to the flight control system, checking if either the pilot or the co-pilot has requested temporary priority of input to the flight control system using the first one of the two input devices associated with either the pilot or the co-pilot. The method further includes the step of if neither the pilot nor the co-pilot has requested temporary priority of input to the flight control system, checking if either the pilot or the co-pilot has requested permanent priority of input to the flight control system using the second one of the two input devices associated with either the pilot or the co-pilot. Also, the method includes the step of if neither the pilot nor the co-pilot has requested permanent priority of input to the flight control system, checking second if both the pilot and the co-pilot have simultaneously issued an input command to the flight control system using the first one of the two input devices associated with either the pilot or the co-pilot. Further, the method includes the step of if either the pilot or the co-pilot has requested temporary priority of input to the flight control system using the first one of the two input devices associated with either the pilot or the co-pilot, assigning temporary priority of input to the flight control system to the one of the pilot or the co-pilot that requested temporary priority of input. Still further, the method includes the step of if either the pilot or the co-pilot has requested permanent priority of input to the flight control system using the second one of the two input devices associated with either the pilot or the co-pilot, assigning permanent priority of input to the flight control system to the one of the pilot or the co-pilot that requested permanent priority of input.

In an advantageous embodiment of the present invention, the method also includes the steps of the method also includes the steps of if one of the pilot or the co-pilot has been assigned temporary priority of input to the flight control system, checking if the other one of the pilot and co-pilot not assigned temporary priority of input to the flight control system has requested temporary priority of input to the flight control system; and if the other one of the pilot and co-pilot not assigned temporary priority of input to the flight control system has requested temporary priority of input to the flight control system, assigning temporary priority of input to the flight control system to the other one of the pilot or the co-pilot that requested temporary priority of input.

In an advantageous embodiment of the present invention, the method also includes the steps of if one of the pilot or the co-pilot has been assigned temporary priority of input to the flight control system, checking if the other one of the pilot and co-pilot not assigned temporary priority of input to the flight control system has requested permanent priority of input to the flight control system; and if the other one of the pilot and co-pilot not assigned temporary priority of input to the flight control system has requested permanent priority of input to the flight control system, assigning permanent priority of input to the flight control system to the other one of the pilot or the co-pilot that requested permanent priority of input.

In an advantageous embodiment of the present invention, the method also includes the steps of if one of the pilot or the co-pilot has been assigned permanent priority of input to the flight control system, checking if the other one of the pilot and co-pilot not assigned permanent priority of input to the flight control system has requested temporary priority of input to the flight control system; and if the other one of the pilot and co-pilot not assigned temporary priority of input to the flight control system has requested permanent priority of input to the flight control system, assigning permanent priority of input to the flight control system to the other one of the pilot or the co-pilot that requested permanent priority of input.

In an advantageous embodiment of the present invention, the method also includes the steps of if one of the pilot or the co-pilot has been assigned permanent priority of input to the flight control system, checking if the other one of the pilot and co-pilot not assigned permanent priority of input to the flight control system has requested permanent priority of input to the flight control system; and if the other one of the pilot and co-pilot not assigned permanent priority of input to the flight control system has requested permanent priority of input to the flight control system, assigning permanent priority of input to the flight control system to the other one of the pilot or the co-pilot that requested permanent priority of input.

In an advantageous embodiment of the present invention, the method also includes the steps of if, as a result of the checking first or checking second if both the pilot and the co-pilot have simultaneously issued an input commend to the flight control system, the pilot and the co-pilot have not both simultaneously issued an input command to the flight control system, checking if either the pilot or the co-pilot has requested either temporary or permanent priority of input to the flight control system and, if so, assigning either temporary or permanent priority to the one of the pilot or the co-pilot that requested the temporary or the permanent priority.

In an advantageous embodiment of the present invention, the method also includes the steps of if either the pilot or the co-pilot has requested temporary priority of input to the flight control system using the first one of the two input devices associated with either the pilot or the co-pilot, checking if an autopilot function on the aircraft is on and if so turning the autopilot function off before assigning temporary priority of input to the flight control system to the one of the pilot or the co-pilot that requested temporary priority of input.

In an advantageous embodiment of the present invention, the method also includes the steps of if either the pilot or the co-pilot has requested temporary priority of input to the flight control system using the first one of the two input devices associated with either the pilot or the co-pilot, checking if an autopilot function on the aircraft is on and if so turning the autopilot function off before assigning temporary priority of input to the flight control system to the one of the pilot or the co-pilot that requested temporary priority of input.

In an advantageous embodiment of the present invention, the method also includes the steps of wherein a first one of the two input devices associated with the pilot comprises one of a sidestick or a yoke; and wherein a first one of the two input devices associated with the co-pilot comprises one of sidestick or a yoke.

In an advantageous embodiment of the present invention, the method also includes the steps of wherein a second one of the two input devices associated with the pilot comprises a pilot actuation device located on a glareshield in a cockpit of the aircraft; and wherein a second one of the two input devices associated with the co-pilot comprises a co-pilot actuation device located on the glareshield.

In an advantageous embodiment of the present invention, the method also includes the steps of providing a visual annunciation cue to both the pilot and the co-pilot that visually indicates which one of the pilot or the co-pilot has been assigned temporary priority of input to the flight control system, or that visually indicates which one of the pilot or the co-pilot has been assigned permanent priority of input to the flight control system.

In an advantageous embodiment of the present invention, the method also includes the steps of providing an aural annunciation cue to both the pilot and the co-pilot that aurally indicates which one of the pilot or the co-pilot has been assigned temporary priority of input to the flight control system, or that indicates which one of the pilot or the co-pilot has been assigned temporary priority of input to the flight control system.

Embodiments of the present invention provide for relatively simple computer logic and a methodology for either the pilot or co-pilot to ensure that his/her sidestick is the only one issuing flight control commands at any one moment in time by first pressing a simple latch button located, for example, on the glareshield in the cockpit and then maneuvering the sidestick in the desired manner to effectuate flight control, e.g., pitch and/or roll, of the aircraft.

Advantages of embodiments of the present invention include the sidestick priority logic providing for a safety feature of the aircraft flight control system in that it allows for one of the pilots to take sole command of the aircraft using his/her sidestick after a "dual input" event in which both pilots inadvertently issued flight control commands (e.g., pitch, roll, pitch trim) to the aircraft flight control system using their sidesticks. The sidestick priority logic of embodiments of the present invention also allows the pilots to delegate sidestick priority to one another in a pre-planned manner usually during an abnormal situation, for example, when some type of failure occurs, or some type of damage occurs due to an event or pilot incapacitation. Such an abnormal situation is highly unusual and is resorted only very unusual situations. Thus, delegating sidestick priority is not normally a crew resource management feature in terms of pilot and co-pilot task prioritization and, as such, is not generally used during a normal flight.

BRIEF DESCRIPTION OF THE DRAWINGS

The various embodiments of the present invention can be understood with reference to the following drawings. The components are not necessarily to scale. Also, in the drawings, like reference numerals designate corresponding parts throughout the several views.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

In embodiments of the present invention, a flight control system for an aircraft includes a processor that processes a plurality of inputs from the aircraft that contains a plurality of control laws that control operation of the aircraft, and that provides a plurality of outputs that control a plurality of devices located on the aircraft. The flight control system also includes a pair of first input devices, a first one of the first input devices controlled by a pilot of the aircraft, a second one of the first input devices controlled by a co-pilot of the aircraft, each one of the first input devices being operable to input a first control signal to the processor to cause the aircraft to be in a first control condition. The flight control system further includes a pair of second input devices located apart from the pair of first input devices, a first one of the second input devices controlled by a pilot of the aircraft, a second one of the second input devices controlled by a co-pilot of the aircraft, each one of the second input devices being operable to input a second control signal to the processor to cause the aircraft to be in a second control condition.

The foregoing and other features of various disclosed embodiments of the invention will be more readily apparent from the following detailed description and drawings of the illustrative embodiments of the invention wherein like reference numbers refer to similar elements.

Figure 1:
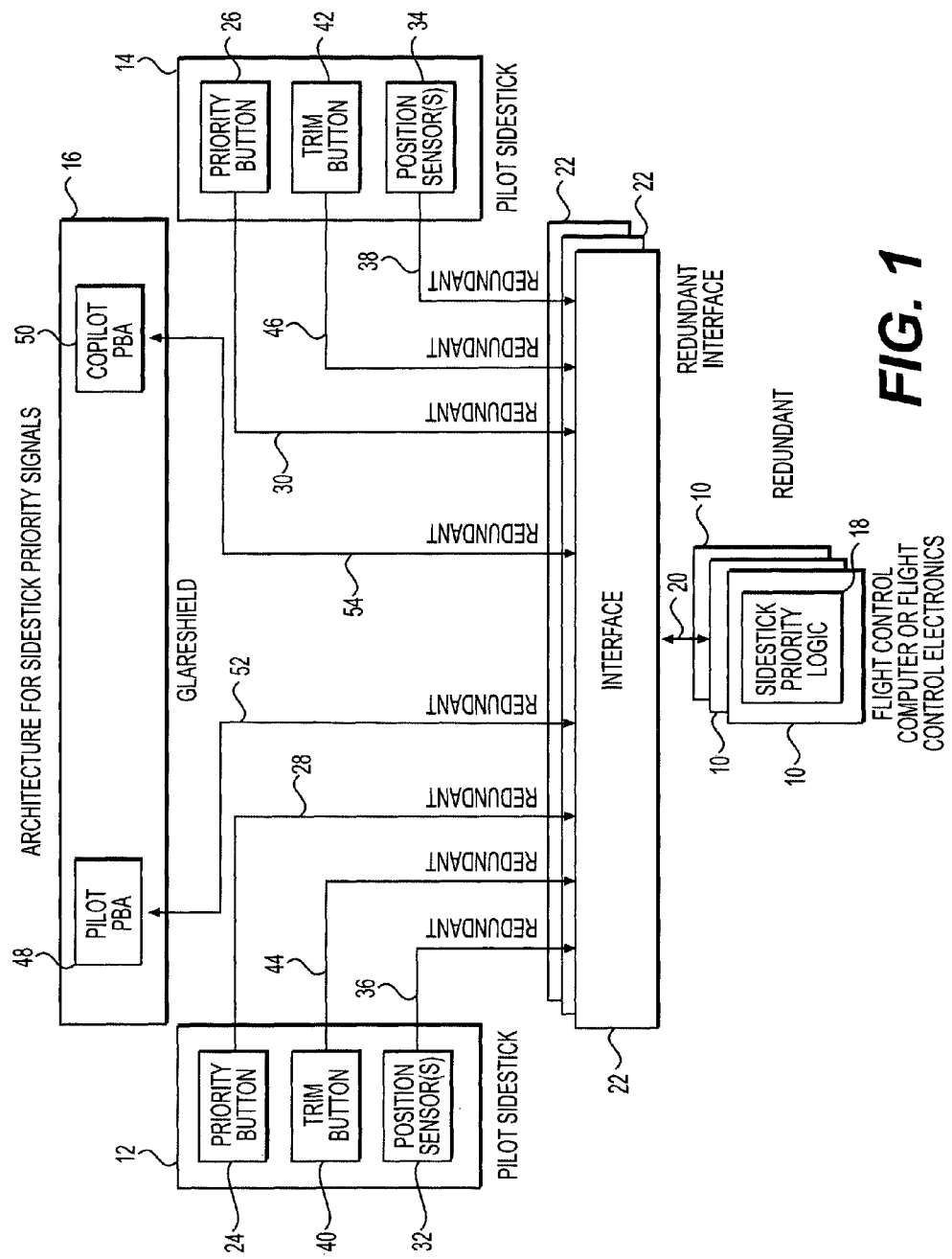
FIG. 1 is a block diagram of flight control electronics or a flight control computer system together with a pair of pilot sidesticks and a cockpit glareshield in accordance with embodiments of the present invention.

Referring to FIG. 1, there illustrated is a block diagram of a flight control electronics box or a flight control computer 10 together with a pair of sidesticks 12, 14 (i.e., pilot sidestick 12 and co-pilot sidestick 14) and a cockpit glareshield 16 in accordance with embodiments of the present invention. According to aspects of the present invention, the flight control electronics box or computer 10 embodies the sidestick priority logic 18 of embodiments of the present invention that is shown in more detail in the block diagram of FIG. 2. As shown in FIG. 1, the flight control computer or flight control electronics box 10 is a triple redundant system ("triplex") in that there are three computers or electronics boxes 10 shown. To improve safety in the event that one of the flight control computers or electronics boxes 10 fails, the other flight control computers 10 or the other flight control electronics boxes 10 may differ somewhat in their hardware and/or software design. This way, a certain type of failure in a single computer or electronics box 10 will not necessarily result in the simultaneous failure of all three computers 10 or all three flight control electronics boxes 10.

The sidestick priority logic 18 may be embodied in each of the three redundant systems 10. However, embodiments of the present invention are not limited to a triple redundant type of flight control computer system or electronics boxes 10. Instead, a single flight control computer or electronics box 10 may be utilized, perhaps either alone or in combination with a mechanical or hydro-mechanical backup system. In the alternative, two, four or even more than four redundant flight control computers or electronics boxes 10 may be utilized, depending upon the type and amount of redundancy desired.

The flight control computers or flight control electronics boxes 10 may comprise the fly-by-wire ("FBW") type of flight control system, as discussed hereinabove in the "BACKGROUND OF THE INVENTION" section. However, it is to be understood that the broadest aspects of embodiments of the present invention are not to be limited to a fly-by-wire type of aircraft flight control system. Other types of aircraft flight control systems may utilize embodiments of the present invention, as should be apparent to one of ordinary skill in the art in light of the teachings herein.

In the alternative, and as should be apparent to one of ordinary skill in the art, the sidestick priority logic 18 of embodiments of the present invention may be embodied in a separate electronics box (not shown) apart from the flight control computers or flight control electronics boxes 10. In this situation, the separate electronics box may host the sidestick priority logic 18 and then provide the resulting flight control commands as output to the flight control computers or flight control electronic boxes 10. Also, the sidestick priority logic 18 of embodiments of the present invention may also be embodied in a separate electronics box (not shown) that is not redundant and is not a part of the flight control computers or flight control electronics boxes 10.

The flight control computers 10 or flight control electronics boxes 10 may each connect through a bidirectional bus 20 with a signal interface unit 22 that may also be triple redundant. Typically a number of signals from various parts of the aircraft connect with each of the three signal interface units 22, which may perform some type of signal conditioning on the signals (e.g., analog to digital conversion, filtering, etc.). However, FIG. 1 only shows signals provided to the interface units 22 from the two sidesticks 12, 14 and the glareshield 16.

Each sidestick 12, 14 includes a "Priority Button" momentary switch 24, 26 that, when depressed or otherwise activated and held in the depressed or activated state by the corresponding pilot or co-pilot, and depending on the current state of the sidestick priority logic 18 at the time the momentary switch on the sidestick 12, 14 is depressed (as discussed in detail hereinafter with respect to the sidestick priority logic diagram of FIG. 2), may or may not allow the pilot or co-pilot to take over momentary sole priority or control for issuing commands to the aircraft flight control system with his/her sidestick 12, 14. In an embodiment of the sidestick priority logic 18 of the present invention discussed in detail hereinafter, the pilot or co-pilot having momentary priority or control at a particular point in time is then enabled to move his/her sidestick 12, 14 in different directions and amounts to make desired changes in the pitch and/or roll of the aircraft. One of the pilots with momentary control at any particular time may also have effects on other switches located on the sidesticks 12, 14, as discussed in detail hereinafter. The electrical signals on the redundant signal lines 28, 30 from the Priority Button momentary switches 24, 26 may be provided to the signal interface units 22 for further signal processing and then on to the flight control computers 10 or flight control electronic boxes 10.

Also, in an embodiment of the present invention, depressing or otherwise activating the momentary priority switch 24, 26 on either sidestick 12, 14 allows the pilot or co-pilot to turn off or disengage the aircraft's autopilot system (if available on the aircraft), if that autopilot system is on or engaged at the time the momentary switch 24, 26 is depressed.

As is known, each sidestick 12, 14 typically includes a number of sensors or transducers 32, 34 (e.g., differential transducers) that sense sidestick movement or position in accordance with desired pitch and roll movements of the aircraft initiated by the pilot or co-pilot. The redundant sensed signals on the lines 36, 38 may be provided to the signal interface units 22 and then on to the aircraft flight control computers 10 or electronic boxes 10 which then issues the appropriate control commands to the corresponding actuators to move the associated flight control surfaces of the aircraft to effectuate the desired pitch and/or roll movement of the aircraft.

Each sidestick 12, 14 may also include a manually-operated trim button or switch 40, 42 that allows the corresponding pilot or co-pilot to make small (e.g., "trim") adjustments to an aircraft parameter such as pitch. The exact function of this pitch trim switch 40, 42 may depend, for example, on what mode the aircraft flight control system is currently operating in. For example in a "normal" mode of operation of the flight control system, the pitch trim switch 40, 42 may function to allow the pilots to make relatively small adjustments to the speed reference of the pitch of the aircraft. In other modes of operation of the aircraft flight control system, the pitch trim switch 40, 42 may allow the pilots to make adjustments to the horizontal stabilizer trim actuators, thereby making relatively small adjustments to the pitch of the aircraft. The redundant pitch trim signals on the lines 44, 46 may be provided to the signal interface units 22 and then on to the aircraft flight control computers 10 or electronic boxes 10 which then issues the appropriate control commands to the corresponding actuators to move the associated flight control surfaces of the aircraft to effectuate the desired pitch of the aircraft.

Similarly, each sidestick 12, 14 may include a manually-operated switch (not shown) that allows the pilot or co-pilot to initiate communications with the other pilot, others in the aircraft, and/or the control tower or other on-ground or in-air personnel.

Also shown in FIG. 1 is a glareshield 16 located in the aircraft cockpit. Typically a single glareshield 16 is provided for both the pilot and co-pilot. However, it is possible to provide a separate glareshield 16 for each of the pilot and another separate glareshield 16 for the co-pilot. The glareshield 16 may have a number of buttons and displays located thereon, as is known. For example, the glareshield 16 may have a pair of similar push button switches (not shown)—one for the pilot and another for the co-pilot—and located on a flight control panel portion of the glareshield 16 to enable either pilot to engage the aircraft autopilot system (if available on the aircraft) if the autopilot system has been disengaged for any reason (for example, by the pilot or co-pilot pressing the "Priority Button" switch 24, 26 on the pilot or co-pilot's sidestick 12, 14).

FIG. 1 also illustrates the glareshield 16 as having a pair of push button annunciators ("PBAs") 48, 50—one for the pilot and another for the co-pilot. According to embodiments of the present invention, each PBA 48, 50 may have a push button that allows the pilot or co-pilot to achieve or take over a more "permanent" type of priority for issuing control commands through his/her sidestick 12, 14 (as opposed to the "momentary" type of priority that occurs when the pilot or co-pilot depresses the "Priority Button" switch 24, 26 on his/her sidestick 12, 14). A more detailed discussion of the sidestick priority logic 18 (including "momentary" and "permanent" priority) is contained hereinafter with respect to FIGS. 2-4.

Each PBA 48, 50 may also contain a visual type of feedback or cue give to the pilot and co-pilot as to the status and the type of the priority as between the pilot and co-pilot. For example, each PBA 48, 50 may contain a flashing or steady visual light that indicates the type or priority that the pilot or co-pilot has at a particular point in time, along with an arrow of a particular color (e.g., red) that indicates which pilot has priority at that particular point in time. More details of the visual cue in each PBA 48, 50 are given with respect to the discussion of the sidestick priority logic 18 of FIG. 2 and also in FIGS. 3 and 4. Further, each PBA 48, 50 communicates with the signal interface units 22 through redundant bidirectional signal lines 52, 54.

Each sidestick 12, 14 is typically shaped to be easily "gripped" by the hand of the pilot or co-pilot. This then makes it relatively easy for the pilot and co-pilot to actuate the Priority Button switch 24, 26 on his/her sidestick 12, 14. In light of the foregoing, these Priority Button switches 24, 26 provide for tactical/time dependent priority taking while the push button portion of each PBA 48, 50 may be used in a relatively more tactical manner.

Figure 2:
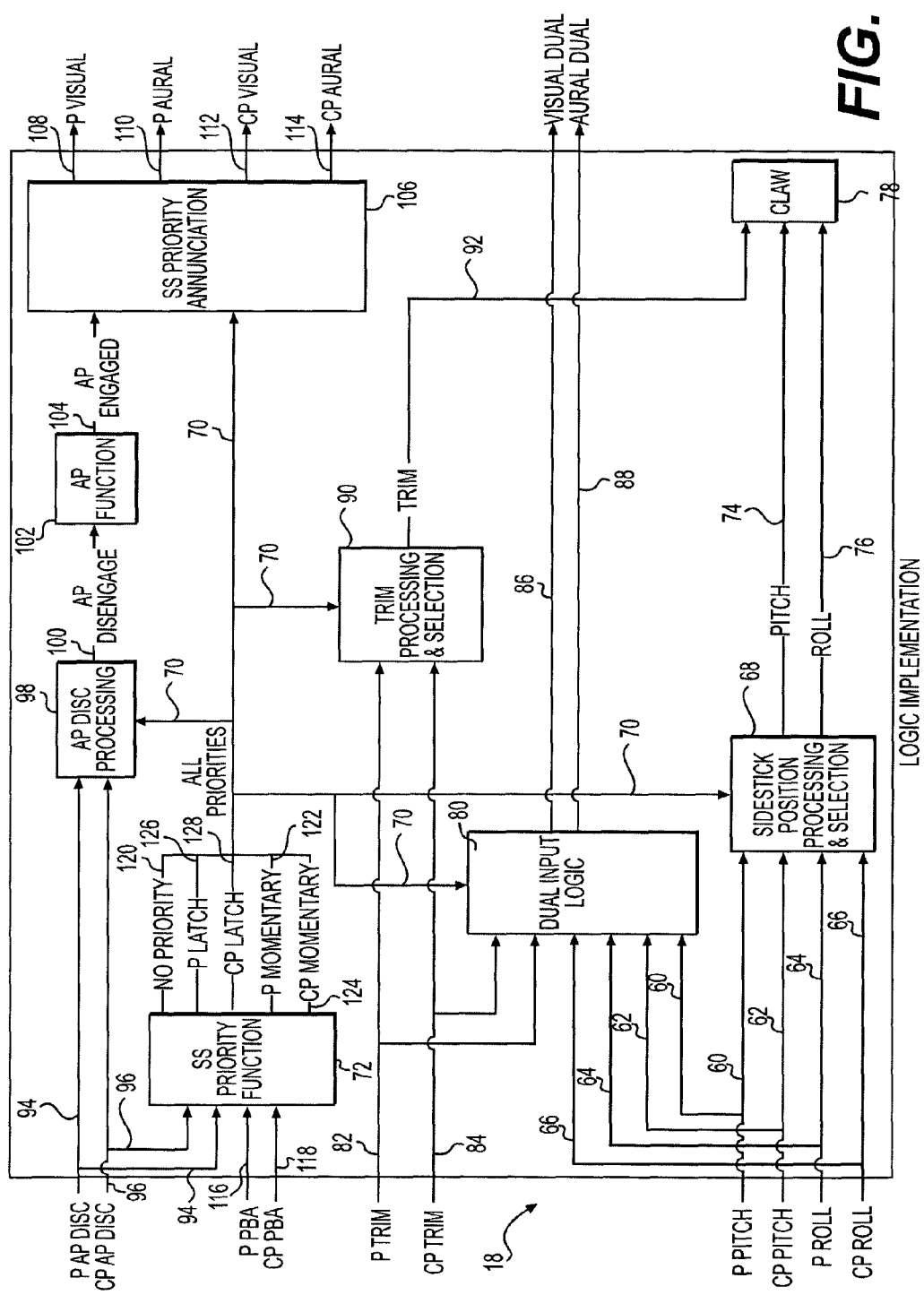
FIG. 2 is a more detailed block diagram of logic within the flight control electronics or flight control computer system that implements the sidestick priority and dual input functions in accordance with embodiments of the present invention.

Referring to FIG. 2, there illustrated is a detailed block diagram of an exemplary implementation of the sidestick priority logic 18 located within the flight control electronic boxes 10 or flight control computers 10 of FIG. 1. In particular, the logic 18 implements the sidestick priority and "dual input" functions of embodiments of the present invention As shown in FIG. 2, the pitch and roll signals from the position sensors 32, 34 in each sidestick 12, 14 fed through the signal interface units 22 and on the bus 20 to the logic 18 are provided on signal lines 60-66 (i.e., signal line 60 for the pilot pitch command signal "P Pitch"; signal line 62 for the co-pilot pitch command signal "CP Pitch"; signal line 64 for the pilot roll command signal "P Roll"; and signal line 66 for the co-pilot roll command signal "CP Roll"). The signals 60-66 are provided to "Sidestick Position Processing & Selection" logic 68 which, when enabled by one of the "All Priorities" signals on a bus 70 from "SS (Sidestick) Priority Function" logic 72 described in more detail hereinafter, provides the "Pitch" and "Roll" command signals on the lines 74 and 76, respectively to the control laws ("CLAWS") logic 78. Although not shown in FIG. 2, the CLAWS logic 78 provides the appropriate control law signals to the aircraft flight control surfaces to achieve the desired pitch and roll of the aircraft.

The pitch and roll signals on the lines 60-66 are also provided to a "Dual Input Logic" circuit 80. Also provided to this logic circuit 80 are pilot trim ("P Trim") and co-pilot trim (CP Trim") signals on lines 82, 84, respectively. These signals 80, 82 originate from the pilot and co-pilot pitch trim buttons or switches 40, 42, respectively, on the pilot and co-pilot sidesticks 12, 14.

The "Dual Input Logic" circuit 80 determines if a "dual input" condition exists in which both the pilot and co-pilot are issuing flight control commands using their respective sidestick 12, 14. An example of a dual input condition is one where one of the pilots is flying the aircraft using his/her sidestick 12, 14, (for example, to issue pitch or roll commands) while the other pilot is now trying to make changes to the pitch and/or roll of the aircraft using his/her sidestick 12, 14, or the other pilot activates the pitch trim button or switch 40, 42 on his her sidestick 12, 14 in an attempt to make a trim adjustment to the pitch of the aircraft. Other dual inputs conditions exist in which essentially both the pilot and co-pilot are issuing flight control commands using his/her own sidestick 12, 14 and neither pilot has taken priority—either momentary or permanent.

These dual input conditions may occur inadvertently or deliberately. Regardless, a dual input condition poses a potentially dangerous situation for the proper control of the aircraft. As such, awareness cues are given to the pilot and co-pilot to alert them both as to the existence of a dual input condition. For example, a signal on a line 86 may be provided by the logic circuit 80 to trigger a visual awareness cue, such as a display flag on the primary flight display in the aircraft cockpit. Other dual input visual awareness cues may exist and be utilized on the aircraft. At the same time, a signal on a line 88 may be provided by the logic circuit 80 to trigger an aural awareness cue such as a recorded voice announcing the existence of the dual input condition repeatedly within the cockpit. Other dual input aural awareness cues may exist (e.g., a buzzer is sounded) and be utilized on the aircraft. Both the visual and aural awareness cues may last only as long as the dual input condition exists, at which point they may turn off. Further, the "Dual Input Logic" circuit may be enabled to provide the signals 86, 88 to enable the visual and aural cues when enabled by one of the "All Priorities" signals on the bus 70. Specifically, in the case of the existence of a dual input condition, the corresponding one of the "All Priorities" signals on the bus 70 would indicate that neither pilot has taken either momentary or permanent priority to thereby enable the provision of the visual and aural awareness cues.

As discussed hereinabove, typically when a dual input function exists, the inputs from the sidesticks 12, 14 of the pilot and co-pilot are algebraically summed and compared to a maximum value or limit, which is not be exceeded primarily for functional reasons. That is, the flight control computer 30 should not provide signals that are at values that are greater than threshold values in an attempt to move the actuators for the various flight control surfaces.

Still referring to FIG. 2, the pilot trim ("P Trim") and co-pilot trim ("CP Trim") signals on the lines 82, 84, respectively, are also provided to the "Trim Processing & Selection" logic 90 which, when properly enabled by one of the "All Priorities" signals on the bus 70, provides a "Trim" output signal on a line 92 to the CLAWS circuit 78. As with the "Pitch" and "Roll" signals on the lines 74, 76, discussed hereinabove, the CLAWS logic 78 similarly is responsive to the "Trim" signal on the line 92 to provide the appropriate control law signals to the aircraft flight control surfaces to achieve the desired pitch of the aircraft.

The "Sidestick Priority Function" logic 72 of FIG. 2 also has provided to it the status of the "Priority Button" 24, 26 on each sidestick 12, 14, respectively. The corresponding signals are shown as "P AP Disc" (i.e., Pilot Autopilot Disconnect") on line 94 and as "CP AP Disc" (i.e., "Co-Pilot Autopilot Disconnect") on line 96. As discussed hereinabove, when the pilot and co-pilot depress the momentary "Priority Button" switch 24, 26 on his/her corresponding sidestick 12, 14, that also acts to disengage or disconnect the autopilot function on the aircraft, if the aircraft flight control system is provided with such an autopilot function and that autopilot function is currently connected at the time either switch 24, 26 is depressed.

Thus, the two disconnect signals on the lines 94, 96 are also provided to "AP Disc Processing" logic 98, which, when properly enabled by one of the "All Priorities" signals on the bus 70, provides an "AP Disengage" signal on a line 100 to "AP (i.e., "Autopilot") Function" logic 102. The result is to disengage or disconnect the autopilot function within the aircraft flight control if it is currently engaged or connected at the time the pilot or co-pilot depresses the momentary "Priority Button" switch 24, 26 on his/her corresponding sidestick 12, 14. On the other hand, if the autopilot function within the aircraft flight control is currently disengaged or disconnected at the time the pilot or co-pilot depresses the momentary "Priority Button" switch 24, 26 on his/her corresponding sidestick 12, 14, then such action by the pilot or co-pilot has no effect on the status of the autopilot function (i.e., the autopilot function remains disengaged or disconnected and cannot be re-engaged until the momentary Priority Button switch 24, 26 is released).

The "Autopilot Function" logic 102 may, under certain situations, function to provide a re-engagement or re-connection of the autopilot function. For example, if the pilot or co-pilot presses the autopilot button on the flight control panel of the glareshield 16, then the autopilot function is re-engaged and this is indicated by a signal on a line 104 that is connected to "SS (Sidestick) Priority Annunciation" logic 106. As described in more detail hereinafter, this logic 106 provides signals on lines 108-114 to both visual and aural annunciation devices during certain sidestick priority situations. More specifically, this autopilot engagement signal on the line 104 may be used to trigger a two second confirmation time in both the visual and aural annunciation devices when the autopilot is engaged and one of the pilots takes momentary priority using the Priority Button switch 24, 26 on his/her respective sidestick 12, 14.

At the same time that the pilot or co-pilot depresses the "Priority Button" 24, 26 on his/her sidestick 12, 14, such action not only has the effects on the autopilot function described hereinabove, but such action of depressing the "Priority Button" 24, 26 also controls the start of "Momentary" priority being given to the pilot or co-pilot who depresses his/her "Priority Button" 24, 26. The "Sidestick Priority Function" logic 72 determines the granting of "Momentary" priority by way of the signals on the lines 94, 96 input to the logic 72.

The "Sidestick Priority Function" logic 72 also has provided to it the signals on the lines 116, 118 that originate from the pilot and co-pilot pushbutton annunciators 48, 50, respectively. The "Sidestick Priority Function" logic 72 thus is provided with the "Momentary" priority signals from the sidesticks 12, 14 as well as the "Permanent" or "Latched" priority signals from the PBAs 48, 50.

In embodiments of the present invention, the "Sidestick Priority Logic" 72 may function as follows in various, situations. For example, in a "normal" or "reset" state, neither the pilot nor the co-pilot is issuing flight control commands using his/her associated sidestick 12, 14 or PBA 48, 50. As such, there is no priority being taken by either pilot nor is there a dual input situation in existence. Thus, there are no visual or aural annunciations made associated with such a "normal" state. Also, the "No Priority" signal on the line 120 is active and output from the "Sidestick Priority Logic" within the "All Priorities" signal bus 70.

Next, if the pilot depresses the "Priority Button" 24 on his/her sidestick 12, then the "P AP Disc" signal on the line 94 becomes active. This disengages the autopilot function within the aircraft flight control system, if the autopilot was engaged at the time the pilot depressed the "Priority Button" 24. If, instead, the autopilot was already disengaged when the pilot pressed the "Priority Button" 24, then the autopilot remains disengaged. Also, the pilot depressing the "Priority Button" 24 on his/her sidestick 12 causes the pilot to have "Momentary" priority in terms of being able to solely issue sidestick pitch and roll commands and to also issue a pilot trim switch command. That is, the co-pilot would be inhibited from also issuing sidestick pitch and roll commands and/or pitch trim commands, and/or disengaging the autopilot function. However, this situation would have no effect on the co-pilot's ability to depress the communications switch (if it is located on the co-pilot's sidestick 14) to initiate verbal communication with a desired party.

Figure 3:
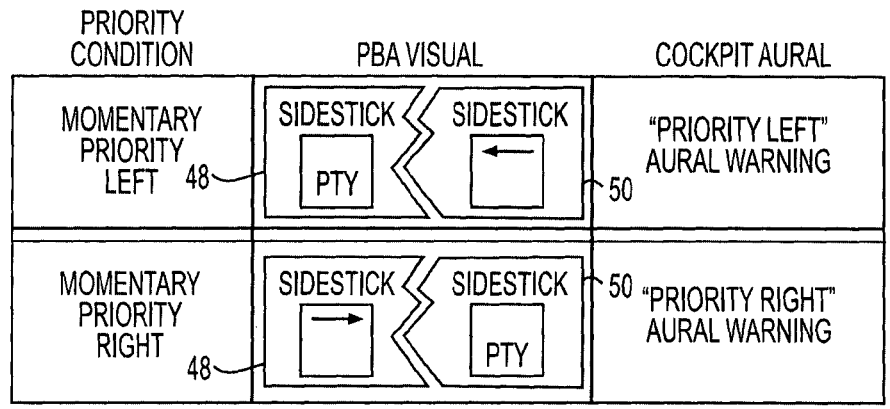
FIG. 3 illustrates the visual (e.g., a flashing light) and aural feedback given to the pilot and co-pilot for two different momentary sidestick priority conditions in accordance with embodiments of the present invention.

Also in this situation, the "P Momentary" signal on the line 122 output from the "Sidestick Priority Function" logic 72 is active and provided on the "All Priorities" bus 70. This causes the signals on the lines 108-114 from the "Sidestick Priority Annunciation" logic 106 to all become active, which causes both visual and aural annunciations to become active. Specifically, referring to FIG. 3, the pilot having "Momentary" priority creates a "Momentary Priority Left" priority condition as shown in FIG. 3. As such, the pilot's PBA 48 may flash a "PTY" visual annunciation in a certain color, such as green, as shown in FIG. 3. This visual annunciation informs the pilot that he/she has sole control flight path. Also, the co-pilot's PBA 50 may show a steady-state red arrow pointing left towards the pilot's position in the cockpit, as shown in FIG. 3. This visual annunciation informs the co-pilot that the pilot now has "Momentary" priority. Further, an aural annunciation such as, for example, a recorded voice broadcast in the cockpit, may say "Priority Left" once at the onset of the time that the pilot has "Momentary" priority.

Then, if the pilot releases the "Priority Button" 24 on his/her sidestick 12, then the pilot loses "Momentary" priority and the logic 18 "resets" or returns to the "normal" state.

However, while the pilot depresses the "Priority Button" 24 on his/her sidestick 12, if the co-pilot then presses the "Priority Button" 26 on his/her sidestick 14, then the co-pilot will be awarded "Momentary" priority and the pilot will lose "Momentary" priority. As such, then the "CP AP Disc" signal on the line 96 becomes active. This has no effect on the autopilot function since it was previously disengaged when the pilot pressed the "Priority Button" 24 on his/her sidestick 12. However, the co-pilot depressing the "Priority Button" 26 on his/her sidestick 14 causes the co-pilot to have "Momentary" priority in terms of being able to solely issue sidestick pitch and roll commands and to also issue a pilot trim switch command. That is, the pilot would now be inhibited from also issuing sidestick pitch and roll commands and/or pitch trim commands, and/or disengaging the autopilot function. However, this situation would have no effect on the pilot's ability to depress the communications switch (if it is located on the pilot's sidestick 14) to initiate verbal communication with a desired party.

Also in this situation, the "CP Momentary" signal on the line 124 output from the "Sidestick Priority Function" logic 72 is active and provided on the "All Priorities" bus 70. This causes the signals on the lines 108-114 from the "Sidestick Priority Annunciation" logic 106 to all become active, which causes both visual and aural annunciations to become active. Specifically, referring to FIG. 3, the co-pilot having "Momentary" priority creates a "Momentary Priority Right" priority condition as shown in FIG. 3. As such, the co-pilot's PBA 50 may flash a "PTY" visual annunciation in a certain color, such as green, as shown in FIG. 3. Also, the pilot's PBA 48 may show a steady-state red arrow pointing right towards the co-pilot's position in the cockpit, as shown in FIG. 3. This visual annunciation informs the pilot that the co-pilot now has "Momentary" priority. Further, an aural annunciation such as, for example, a recorded voice broadcast in the cockpit, may say "Priority Right" once at the onset of time that the co-pilot has "Momentary" priority.

Then, if the co-pilot releases the "Priority Button" 26 on his/her sidestick 14, then the co-pilot loses "Momentary" priority and the logic 18 "resets" or returns to the "normal" state.

However, if the co-pilot keeps depressing the "Priority Button" 26 on his/her sidestick 14, then the pilot could come back and depress the "Priority Button" 24 on his/her sidestick 12, and the situation described hereinabove with respect to the pilot having "Momentary" priority results again. Thus, one can see that this is a type of "last one wins" in terms of the pilot and co-pilot repeatedly taking over "Momentary" priority from one another for so long as one of the pilot and co-pilot has "momentary" priority by maintaining his/her "Priority Button" 24, 26 in a depressed state.

The above description of the pilot or the co-pilot taking "Momentary" priority if the priority logic 18 of FIG. 2 is in a "normal" condition or if one of the pilot or co-pilot already has "Momentary" priority also applies if the priority logic 18 of FIG. 2 is in a "dual input" condition when one of the pilot or co-pilot presses his/her "Priority Button" 24, 26 on his/her sidestick 12, 14.

Now, if the sidestick priority logic 18 is in either a "normal" condition, a "dual input" condition, or if either the pilot or co-pilot currently has "Momentary" priority, then either the pilot or co-pilot can take over a more "Permanent" or "Latched" priority. According to embodiments of the present invention, this may be accomplished by the pilot depressing the button portion of the pilot PBA 48 located on the glareshield 16. Further, according to embodiments of the present invention, the pilot is not required to hold the button on his/her PBA 48 for any length of time, in contrast other known, prior art devices that require, for example, the priority button on the pilot sidestick to be depressed for 30 seconds until a latched condition occurs. Embodiments of the present invention thus allow the pilot to quickly place the priority logic 18 in a "Permanent" priority condition, which then frees up the pilot to perform other tasks. Also, the "Permanent" priority condition may be achieved regardless of whether the autopilot is engaged or dis-engaged.

Similar to the pilot taking "Momentary" priority using the "Priority Button" 24 on his/her sidestick 12, as described in detail hereinabove, when the pilot takes "Permanent" priority it allows the pilot to be able to solely issue sidestick pitch and roll commands and to also issue a pilot trim switch command. That is, the co-pilot would be inhibited from also issuing sidestick pitch and roll commands and/or pitch trim commands, and/or disengaging the autopilot function. However, this situation would have no effect on the co-pilot's ability to depress the communications switch (if it is located on the co-pilot's sidestick 14) to initiate verbal communication with a desired party.

Also, when the pilot has "Permanent" priority, if either the pilot or co-pilot depresses the "Priority Button" 24, 26 on his/her sidestick 12, 14, such action has no consequences and the priority logic 18 remains in a pilot "Permanent" priority condition. In addition, when the pilot has "Permanent" priority and if the pilot presses the button on his/her PBA 48 again, then the priority logic goes into "reset" or "normal" mode."

Figure 4:
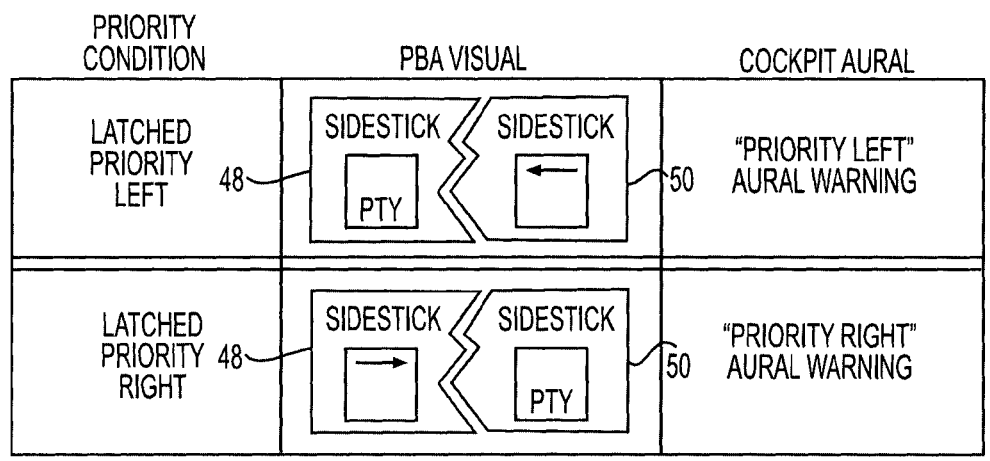
FIG. 4 illustrates the visual and aural feedback given to the pilot and co-pilot for two different permanent sidestick priority conditions in accordance with embodiments of the present invention.

When the pilot presses the button portion of his/her PBA 48, the "P PBA" signal on the line 116 becomes active, which is provided to the "Sidestick Priority Function" logic 72. In this situation, the "P Latch" signal on the line 126 output from the "Sidestick Priority Function" logic 72 is active and provided on the "All Priorities" bus 70. This causes the signals on the lines 108-114 from the "Sidestick Priority Annunciation" logic 106 to all become active, which causes both visual and aural annunciations to become active. Specifically, referring to FIG. 4, the pilot having "Permanent" priority creates a "Latched Priority Left" priority condition as shown in FIG. 4. As such, the pilot's PBA 48 may visually indicate a "PTY" annunciation or cue in a continuous manner (i.e., not flashing) in a certain color, such as green, as shown in FIG. 4. Also, the co-pilot's PBA 50 may show a steady-state red arrow pointing left towards the pilot's position in the cockpit, as shown in FIG. 4. This visual annunciation informs the co-pilot that the pilot now has "Permanent" or "Latched" priority. Further, an aural annunciation such as, for example, a recorded voice broadcast in the cockpit, may say "Priority Left" once at the onset of the time that the pilot has "Permanent" priority.

While the pilot has "Permanent" priority, if the co-pilot then presses the button portion of his/her PBA 50, then the co-pilot will be awarded "Permanent" priority and the pilot will lose "Permanent" priority. As such, then the "CP PBA" signal on the line 118 becomes active and the co-pilot now has "Permanent" priority in terms of being able to solely issue sidestick pitch and roll commands and to also issue a pilot trim switch command. That is, the pilot would now be inhibited from also issuing sidestick pitch and roll commands and/or pitch trim commands, and/or disengaging the autopilot function. However, this situation would have no effect on the pilot's ability to depress the communications switch (if it is located on the pilot's sidestick 14) to initiate verbal communication with a desired party.

Also in this situation, the "CP Latch" signal on the line 128 output from the "Sidestick Priority Function" logic 72 is active and provided on the "All Priorities" bus 70. This causes the signals on the lines 108-114 from the "Sidestick Priority Annunciation" logic 106 to all become active, which causes both visual and aural annunciations to become active. Specifically, referring to FIG. 4, the co-pilot having "Permanent" priority creates a "Latched Priority Right" priority condition as shown in FIG. 4. As such, the co-pilot's PBA 50 may visually indicate a "PTY" annunciation or cue in a continuous manner (i.e., not flashing) in a certain color, such as green, as shown in FIG. 4. Also, the co-pilot's PBA 50 may show a steady-state red arrow pointing left towards the pilot's position in the cockpit, as shown in FIG. 4. This visual annunciation informs the pilot that the co-pilot now has "Permanent" priority. Further, an aural annunciation such as, for example, a recorded voice broadcast in the cockpit, may say "Priority Right" once at the onset of the time that the co-pilot has "Permanent" priority.

Also, when the co-pilot has "Permanent" priority, if either the pilot or co-pilot depresses the "Priority Button" 24, 26 on his/her sidestick 12, 14, such action has no consequences and the priority logic 18 remains in a co-pilot "Permanent" priority condition. In addition, when the co-pilot has "Permanent" priority and if the co-pilot presses the button on his/her PBA 50 again, then the priority logic goes into "reset" or "normal" mode."

If either the pilot or co-pilot has "Permanent" priority, the other one of the pilot or co-pilot can press the button portion of his/her PBA 48, 50 and take over "Permanent" priority. As such, the situations described hereinabove with respect to the pilot or co-pilot having "Permanent" priority results again. Thus, one can see that this is a type of "last one wins" in terms of the pilot and co-pilot repeatedly taking over "Permanent" priority from one another by merely pressing the button portion of his/her PBA 48, 50. This is similar to the "last one wins" "Momentary" priority situation described hereinabove.

Figure 5:
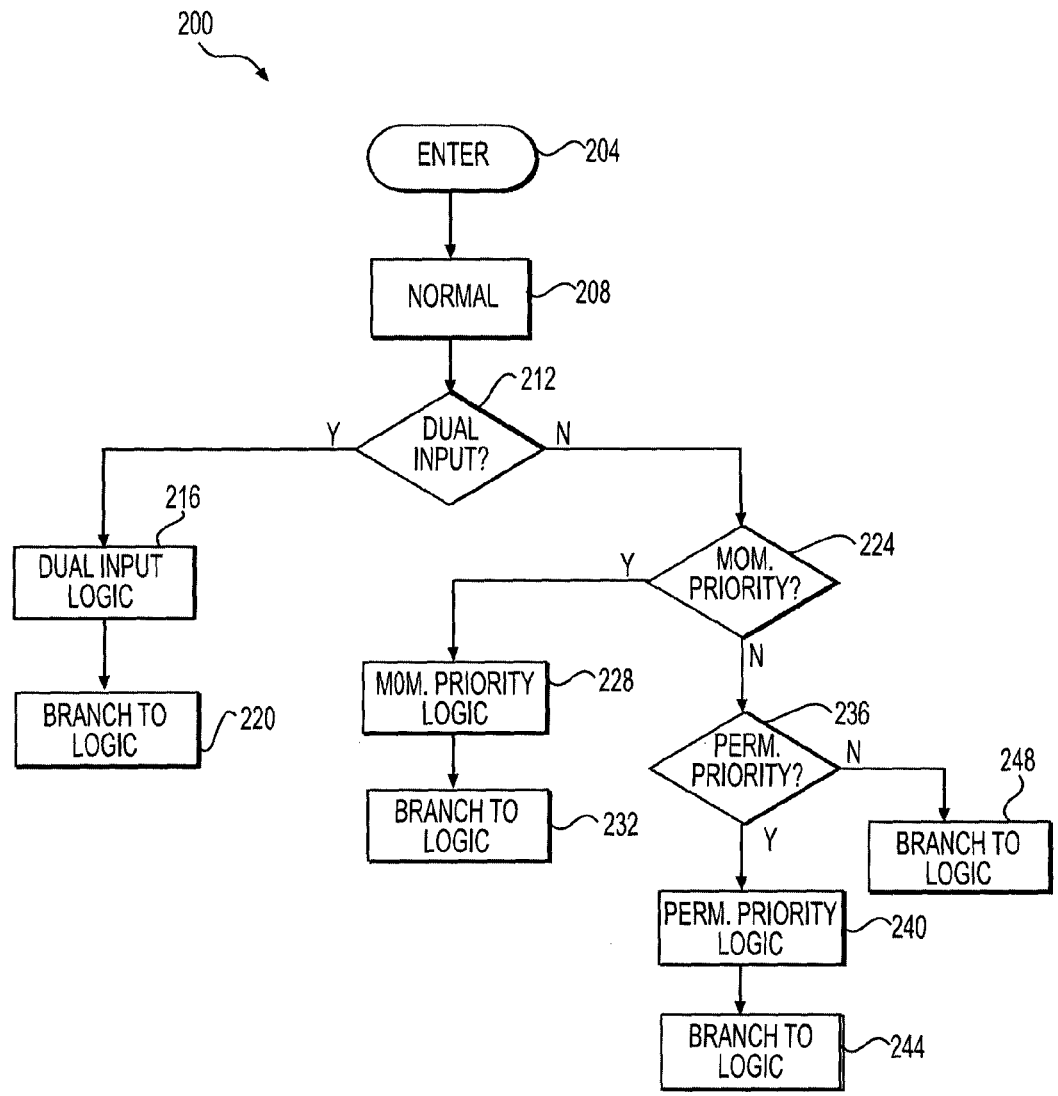
FIG. 5 is a simplified flow chart of steps executed in a method for determining priority as between the pilot and co-pilot and for handling a dual input condition, in accordance with embodiments of the present invention.

Referring to FIG. 5, there illustrated is a simplified flow chart 200 of steps executed in a method for determining priority as between the pilot and co-pilot and for handling a dual input condition, in accordance with embodiments of the present invention.

After an enter step 204, the method typically starts out in the "Normal" state 208, as discussed in detail hereinabove. The method then checks, in a step 212, whether a "dual input" condition described hereinabove exists. If so, then the method branches to a step 216 where the dual input logic described hereinabove is executed. This includes, for example, a check as to whether or not the autopilot is engaged or disengaged. It also includes checks to see if the pilot or co-pilot has taken "Momentary" or "Permanent" priority—all described in detail hereinabove with respect to FIGS. 1-4. If any of these checks are valid or become true, then the "dual input" logic path branches to the appropriate logic in a step 220.

If, instead, the "dual input" condition does not exist, then the method checks, in a step 224, if either the pilot or co-pilot has taken "Momentary" priority by depressing the "Priority Button" 24, 26 on his/her sidestick 12, 24. If so, then the method executes in a step 228 the "Momentary" priority logic described in detail hereinabove. During this step 228 the method checks if any of the other possible situations now exist (e.g., "Permanent" priority, the other pilot taking "Momentary" priority, etc.) and if so, the method branches in a step 232 to the appropriate logic.

If, instead, neither the pilot or co-pilot has taken "Momentary" priority, then the method branches to a step 236 where it checks if the pilot or co-pilot has taken "Permanent" or "Latched" priority. If so, the method executes in a step 240 the "Permanent" priority logic described in detail hereinabove. During this step 240 the method checks if any of the other possible situations now exist (e.g., the pilot resetting the logic, the other pilot taking "Permanent" priority, etc.) and if so, the method branches in a step 244 to the appropriate logic.

If the pilot or co-pilot has not taken "Permanent" priority, then the method branches to a step 248 where it executes the appropriate logic (e.g., the "normal" logic, the "dual input" logic, etc.).

It should be understood that the method of the flow chart 200 of FIG. 5 is purely exemplary. The steps illustrated in FIG. 5 may be executed in other than the order shown there, or one or more of the steps (i.e., checking for "normal" mode, checking for "dual input" mode, checking for "Momentary" priority, checking for "Permanent" priority, etc.) may be executed simultaneously.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable medium(s) having computer readable program code embodied thereon. The computer program product may, for example, be executed by a computer, a processor or electronics, such as, for example, the flight control computer 10 or the flight control electronic boxes 10 illustrated in FIG. 1.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., the flight control computers 10 of FIG. 1), other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

What is claimed is:

1. A flight control system for an aircraft, comprising:
   a processor that processes a plurality of inputs from the aircraft, that contains a plurality of control laws that control operation of the aircraft, and that provides a plurality of outputs that control a plurality of devices located on the aircraft;
   a pair of first input devices, a first one of the first input devices controlled by a pilot of the aircraft, a second one of the first input devices controlled by a co-pilot of the aircraft, each one of the first input devices being operable to input a first control signal to the processor to cause the aircraft to be in a momentary first priority control condition; and
   a pair of second input devices located apart from the pair of first input devices, a first one of the second input devices controlled by a pilot of the aircraft, a second one of the second input devices controlled by a co-pilot of the aircraft, each one of the second input devices being operable to input a second control signal to the processor to cause the aircraft to be in a momentary second priority control condition.

2. The flight control system of claim 1, wherein each one of the pair of first input devices comprises a sidestick controller.

3. The flight control system of claim 2, wherein each sidestick controller includes a momentary priority switch that, when activated by the pilot or co-pilot, is operable to input the first control signal to the processor.

4. The flight control system of claim 3, wherein the first control signal indicates which one of the pilot or co-pilot has current momentary control of the aircraft.

5. The flight control system of claim 4, wherein when the pilot or co-pilot has current momentary control of the aircraft, the other one of the pilot or co-pilot can take over current momentary control of the aircraft by activating the momentary priority switch on the corresponding sidestick controller.

6. The flight control system of claim 4, wherein visual and/or aural awareness cues are provided to announce to the pilot and co-pilot which one of the pilot or co-pilot has current momentary control of the aircraft.

7. The flight control system of claim 1, wherein each one of the pair of second input devices comprises a push button annunciator.

8. The flight control system of claim 7, wherein each push button annunciator includes a permanent priority switch that, when activated by the pilot or co-pilot, is operable to input the second control signal to the processor.

9. The flight control system of claim 8, wherein the second control signal indicates which one of the pilot or co-pilot has current permanent control of the aircraft.

10. The flight control system of claim 8, wherein when the pilot or co-pilot has current permanent control of the aircraft, the other one of the pilot or co-pilot can take over current permanent control of the aircraft by activating the corresponding push button annunciator.

11. The flight control system of claim 7, wherein each one of the push button annunciators is located on a glareshield within a cockpit of the aircraft.

12. The flight control system of claim 7, wherein a glareshield within a cockpit of the aircraft includes a visual cue that announces to the pilot and co-pilot which one of the pilot or co-pilot has current permanent control of the aircraft.

13. The flight control system of claim 8, wherein visual and/or aural awareness cues are provided to announce to the pilot and co-pilot which one of the pilot or co-pilot has current permanent control of the aircraft.

14. The flight control system of claim 1, wherein each one of the pair of first input devices comprises a sidestick controller, each sidestick controller being movable by the corresponding pilot and co-pilot to issue a plurality of control commands to the processor.

15. The flight control system of claim 14, wherein the plurality of control commands include aircraft pitch and roll commands.

16. The flight control system of claim 14, wherein when the pilot and co-pilot simultaneously issue the plurality of commands to the processor, a dual input condition occurs.

17. The flight control system of claim 16, wherein when the dual input condition occurs, both visual and aural awareness cues relating to the existence of the dual input condition are provided to the pilot and co-pilot.

18. The flight control system of claim 1, wherein the flight control system comprises a fly-by-wire type of aircraft control system.

19. The flight control system of claim 1, wherein the pair of first input devices comprises at least one yoke.

20. A method for controlling a priority of input to an aircraft flight control system between a pilot and a co-pilot each using two input devices associated with the pilot and the co-pilot, respectively, the method comprising the steps of:
  checking first if both the pilot and the co-pilot have simultaneously issued an input command to the flight control system using a first one of the two input devices associated with either the pilot or the co-pilot;
  if both the pilot and the co-pilot have simultaneously issued an input command to the flight control system, checking if either the pilot or the co-pilot has requested temporary priority of input to the flight control system using the first one of the two input devices associated with either the pilot or the co-pilot;
  if neither the pilot nor the co-pilot has requested temporary priority of input to the flight control system, checking if either the pilot or the co-pilot has requested permanent priority of input to the flight control system using a second one of the two input devices associated with either the pilot or the co-pilot, the second one of the two input devices being located apart from the first one of the two input devices;
  if neither the pilot nor the co-pilot has requested permanent priority of input to the flight control system, checking second if both the pilot and the co-pilot have simultaneously issued an input command to the flight control system using the first one of the two input devices associated with either the pilot or the co-pilot;
  if either the pilot or the co-pilot has requested temporary priority of input to the flight control system using the first one of the two input devices associated with either the pilot or the co-pilot, assigning temporary priority of input to the flight control system to the one of the pilot or the co-pilot that requested temporary priority of input; and
  if either the pilot or the co-pilot has requested permanent priority of input to the flight control system using the second one of the two input devices associated with either the pilot or the co-pilot, assigning permanent priority of input to the flight control system to the one of the pilot or the co-pilot that requested permanent priority of input.

21. The method of claim 20, wherein:
  if one of the pilot or the co-pilot has been assigned temporary priority of input to the flight control system, checking if the other one of the pilot and co-pilot not assigned temporary priority of input to the flight control system has requested temporary priority of input to the flight control system; and
  if the other one of the pilot and co-pilot not assigned temporary priority of input to the flight control system has requested temporary priority of input to the flight control system, assigning temporary priority of input to the flight control system to the other one of the pilot or the co-pilot that requested temporary priority of input.

22. The method of claim 20, wherein:
  if one of the pilot or the co-pilot has been assigned temporary priority of input to the flight control system, checking if the other one of the pilot and co-pilot not assigned temporary priority of input to the flight control system has requested permanent priority of input to the flight control system; and
  if the other one of the pilot and co-pilot not assigned temporary priority of input to the flight control system has requested permanent priority of input to the flight control system, assigning permanent priority of input to the flight control system to the other one of the pilot or the co-pilot that requested permanent priority of input.

23. The method of claim 20, wherein:
  if one of the pilot or the co-pilot has been assigned permanent priority of input to the flight control system, checking if the other one of the pilot and co-pilot not assigned permanent priority of input to the flight control system has requested temporary priority of input to the flight control system; and
  if the other one of the pilot and co-pilot not assigned permanent priority of input to the flight control system has requested temporary priority of input to the flight control system, assigning temporary priority of input to the flight control system to the other one of the pilot or the co-pilot that requested temporary priority of input.

24. The method of claim 20, wherein:
if one of the pilot or the co-pilot has been assigned permanent priority of input to the flight control system, checking if the other one of the pilot and co-pilot not assigned permanent priority of input to the flight control system has requested permanent priority of input to the flight control system; and
if the other one of the pilot and co-pilot not assigned permanent priority of input to the flight control system has requested permanent priority of input to the flight control system, assigning permanent priority of input to the flight control system to the other one of the pilot or the co-pilot that requested permanent priority of input.

25. The method of claim 20, wherein:
if, as a result of the checking first or checking second if both the pilot and the co-pilot have simultaneously issued an input command to the flight control system, the pilot and the co-pilot have not both simultaneously issued an input command to the flight control system, checking if either the pilot or the co-pilot has requested either temporary or permanent priority of input to the flight control system and, if so, assigning either temporary or permanent priority to the one of the pilot or the co-pilot that requested the temporary or the permanent priority.

26. The method of claim 20, wherein:
if either the pilot or the co-pilot has requested temporary priority of input to the flight control system using the first one of the two input devices associated with either the pilot or the co-pilot, checking if an autopilot function on the aircraft is on and if so turning the autopilot function off before assigning temporary priority of input to the flight control system to the one of the pilot or the co-pilot that requested temporary priority of input.

27. The method of claim 25, wherein:
if either the pilot or the co-pilot has requested temporary priority of input to the flight control system using the first one of the two input devices associated with either the pilot or the co-pilot, checking if an autopilot function on the aircraft is on and if so turning the autopilot function off before assigning temporary priority of input to the flight control system to the one of the pilot or the co-pilot that requested temporary priority of input.

28. The method of claim 20, wherein a first one of the two input devices associated with the pilot comprises one of a sidestick or a yoke; and wherein a first one of the two input devices associated with the co-pilot comprises one of sidestick or a yoke.

29. The method of claim 20, wherein a second one of the two input devices associated with the pilot comprises a pilot actuation device located on a glareshield in a cockpit of the aircraft; and wherein a second one of the two input devices associated with the co-pilot comprises a co-pilot actuation device located on the glareshield.

30. The method of claim 20, further comprising providing a visual annunciation cue to both the pilot and the co-pilot that visually indicates which one of the pilot or the co-pilot has been assigned temporary priority of input to the flight control system, or that visually indicates which one of the pilot or the co-pilot has been assigned permanent priority of input to the flight control system.

31. The method of claim 20, further comprising providing an aural annunciation cue to both the pilot and the co-pilot that aurally indicates which one of the pilot or the co-pilot has been assigned temporary priority of input to the flight control system, or that indicates which one of the pilot or the co-pilot has been assigned temporary priority of input to the flight control system.

32. A computer program product for controlling a priority of input to an aircraft flight control system between a pilot and a co-pilot each using two input devices associated with the pilot and the co-pilot, respectively, the computer program product comprising a non-transitory computer readable storage medium having program code embodied therewith, the program code readable/executable by a computer, processor or logic circuit to perform a method comprising the steps of:
checking first if both the pilot and the co-pilot have simultaneously issued an input command to the flight control system using a first one of the two input devices associated with either the pilot or the co-pilot;
if both the pilot and the co-pilot have simultaneously issued an input command to the flight control system, checking if either the pilot or the co-pilot has requested temporary priority of input to the flight control system using the first one of the two input devices associated with either the pilot or the co-pilot;
if neither the pilot nor the co-pilot has requested temporary priority of input to the flight control system, checking if either the pilot or the co-pilot has requested permanent priority of input to the flight control system using a second one of the two input devices associated with either the pilot or the co-pilot, the second one of the two input devices being located apart from the first one of the two input devices;
if neither the pilot nor the co-pilot has requested permanent priority of input to the flight control system, checking second if both the pilot and the co-pilot have simultaneously issued an input command to the flight control system using the first one of the two input devices associated with either the pilot or the co-pilot;
if either the pilot or the co-pilot has requested temporary priority of input to the flight control system using the first one of the two input devices associated with either the pilot or the co-pilot, assigning temporary priority of input to the flight control system to the one of the pilot or the co-pilot that requested temporary priority of input; and
if either the pilot or the co-pilot has requested permanent priority of input to the flight control system using the second one of the two input devices associated with either the pilot or the co-pilot, assigning permanent priority of input to the flight control system to the one of the pilot or the co-pilot that requested permanent priority of input.

33. The computer program product of claim 32, wherein:
if one of the pilot or the co-pilot has been assigned temporary priority of input to the flight control system, checking if the other one of the pilot and co-pilot not assigned temporary priority of input to the flight control system has requested temporary priority of input to the flight control system; and
if the other one of the pilot and co-pilot not assigned temporary priority of input to the flight control system has requested temporary priority of input to the flight control system, assigning temporary priority of input to the flight control system to the other one of the pilot or the co-pilot that requested temporary priority of input.

34. The computer program product of claim 32, wherein:
if one of the pilot or the co-pilot has been assigned temporary priority of input to the flight control system, checking if the other one of the pilot and co-pilot not assigned temporary priority of input to the flight control system has requested permanent priority of input to the flight control system; and
if the other one of the pilot and co-pilot not assigned temporary priority of input to the flight control system has requested permanent priority of input to the flight control system, assigning permanent priority of input to the flight control system to the other one of the pilot or the co-pilot that requested permanent priority of input.

35. The computer program product of claim 32, wherein:
if one of the pilot or the co-pilot has been assigned permanent priority of input to the flight control system, checking if the other one of the pilot and co-pilot not assigned permanent priority of input to the flight control system has requested temporary priority of input to the flight control system; and
if the other one of the pilot and co-pilot not assigned permanent priority of input to the flight control system has requested temporary priority of input to the flight control system, assigning temporary priority of input to the flight control system to the other one of the pilot or the co-pilot that requested temporary priority of input.

36. The computer program product of claim 32, wherein:
if one of the pilot or the co-pilot has been assigned permanent priority of input to the flight control system, checking if the other one of the pilot and co-pilot not assigned permanent priority of input to the flight control system has requested permanent priority of input to the flight control system; and
if the other one of the pilot and co-pilot not assigned permanent priority of input to the flight control system has requested permanent priority of input to the flight control system, assigning permanent priority of input to the flight control system to the other one of the pilot or the co-pilot that requested permanent priority of input.

37. The computer program product of claim 32, wherein:
if, as a result of the checking first or checking second if both the pilot and the co-pilot have simultaneously issued an input command to the flight control system, the pilot and the co-pilot have not both simultaneously issued an input command to the flight control system, checking if either the pilot or the co-pilot has requested either temporary or permanent priority of input to the flight control system and, if so, assigning either temporary or permanent priority to the one of the pilot or the co-pilot that requested the temporary or the permanent priority.

38. The computer program product of claim 32, wherein:
if either the pilot or the co-pilot has requested temporary priority of input to the flight control system using the first one of the two input devices associated with either the pilot or the co-pilot, checking if an autopilot function on the aircraft is on and if so turning the autopilot function off before assigning temporary priority of input to the flight control system to the one of the pilot or the co-pilot that requested temporary priority of input.

39. The computer program product of claim 37, wherein:
if either the pilot or the co-pilot has requested temporary priority of input to the flight control system using the first one of the two input devices associated with either the pilot or the co-pilot, checking if an autopilot function on the aircraft is on and if so turning the autopilot function off before assigning temporary priority of input to the flight control system to the one of the pilot or the co-pilot that requested temporary priority of input.

40. The computer program product of claim 32, wherein a first one of the two input devices associated with the pilot comprises one of a sidestick or a yoke; and wherein a first one of the two input devices associated with the co-pilot comprises one of sidestick or a yoke.

41. The computer program product of claim 32, wherein a second one of the two input devices associated with the pilot comprises a pilot actuation device located on a glareshield in a cockpit of the aircraft; and wherein a second one of the two input devices associated with the co-pilot comprises a co-pilot actuation device located on the glareshield.

42. The computer program product of claim 32, further comprising providing a visual annunciation cue to both the pilot and the co-pilot that visually indicates which one of the pilot or the co-pilot has been assigned temporary priority of input to the flight control system, or that visually indicates which one of the pilot or the co-pilot has been assigned permanent priority of input to the flight control system.

43. The computer program product of claim 32, further comprising providing an aural annunciation cue to both the pilot and the co-pilot that aurally indicates which one of the pilot or the co-pilot has been assigned temporary priority of input to the flight control system, or that indicates which one of the pilot or the co-pilot has been assigned temporary priority of input to the flight control system.

* * * * *

UNITED STATES PATENT AND TRADEMARK OFFICE
CERTIFICATE OF CORRECTION

Page 1 of 1

PATENT NO. : 9,690,291 B2
APPLICATION NO. : 14/896940
DATED : June 27, 2017
INVENTOR(S) : Benoit Ouellette, Sophie Duchesne and Frederic Lecoq It is certified that error appears in the above-identified patent and that said Letters Patent is hereby corrected as shown below:

In the Claims

In Column 22, Line 54, the term "momentary" should be replaced with --permanent--.

Signed and Sealed this
Tenth Day of April, 2018

Andrei Iancu
*Director of the United States Patent and Trademark Office*